United States Patent
Gibson et al.

(10) Patent No.: US 9,365,211 B2
(45) Date of Patent: Jun. 14, 2016

(54) DELAY CHANGING ON/OFF STATE OF ENGINE DURING CRUISE CONTROL IN A HYBRID VEHICLE

(71) Applicant: FORD GLOBAL TECHNOLOGIES, LLC, Dearborn, MI (US)

(72) Inventors: Alexander O'Connor Gibson, Ann Arbor, MI (US); Felix Nedorezov, Rochester Hills, MI (US); Xiaoyong Wang, Novi, MI (US); Matthew John Shelton, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 14/509,481

(22) Filed: Oct. 8, 2014

(65) Prior Publication Data

US 2016/0101775 A1    Apr. 14, 2016

(51) Int. Cl.
| | |
|---|---|
| *B60K 31/00* | (2006.01) |
| *B60W 50/00* | (2006.01) |
| *B60W 20/00* | (2016.01) |
| *F02N 11/00* | (2006.01) |
| *B60W 30/14* | (2006.01) |
| *F02N 11/08* | (2006.01) |
| *B60W 10/06* | (2006.01) |
| *B60K 6/48* | (2007.10) |

(52) U.S. Cl.
CPC ............. *B60W 20/20* (2013.01); *B60K 6/48* (2013.01); *B60W 10/06* (2013.01); *B60W 30/143* (2013.01); *F02N 11/0837* (2013.01); *B60W 2520/105* (2013.01); *Y10S 903/902* (2013.01)

(58) Field of Classification Search
CPC ............. B60W 10/08; B60W 10/02; B60W 2710/0666; B60W 2710/021; B60W 2710/644; B60W 2510/0657; B60W 2510/081; B60W 2510/083; B60W 20/30; B60W 2510/082; B60W 2510/10; B60W 2710/1005; B60W 30/14; B60L 2240/421; B60K 6/26; F02N 11/04; F02N 2200/0801
See application file for complete search history.

(56) References Cited

U.S. PATENT DOCUMENTS

| | | | |
|---|---|---|---|
| 8,082,089 B2 | 12/2011 | Morgan et al. | |
| 8,740,744 B2 | 6/2014 | Grutter et al. | |
| 8,935,075 B2 * | 1/2015 | Otanez | F02N 11/0837 123/179.3 |
| 2003/0105574 A1 * | 6/2003 | Ino | B60K 31/0008 701/93 |
| 2008/0306669 A1 * | 12/2008 | Wang | B60K 31/00 701/93 |
| 2009/0164081 A1 * | 6/2009 | Meloche | B60W 30/1882 701/94 |
| 2010/0125019 A1 * | 5/2010 | Tabata | B60K 6/365 477/3 |
| 2012/0271524 A1 * | 10/2012 | Eriksson | B60W 10/08 701/93 |
| 2013/0035839 A1 * | 2/2013 | Otanez | F02N 11/0837 701/102 |

\* cited by examiner

*Primary Examiner* — Jerrah Edwards
*Assistant Examiner* — Demetra Smith-Stewart
(74) *Attorney, Agent, or Firm* — David B. Kelley; Brooks Kushman P.C.

(57) ABSTRACT

A hybrid vehicle includes an engine and an electric machine selectively coupled to the engine via a disconnect clutch. At least one controller issues commands to control the engine, the electric machine, and the clutch. During cruise control, the controller controls the torque output of the engine and electric machine, as well as the slipping of the clutch, such that the speed of the vehicle is attempted to be maintained at the cruise control set speed. For example, when the engine is off and additional torque is necessary to maintain the speed, the controller can issue a command to change the state of the engine from off to on. When the vehicle experiences oscillations in road load, the controller delays or inhibits changing the on/off state of the engine for an amount of time that is based on the oscillation associated with road load.

18 Claims, 4 Drawing Sheets

DELAY CHANGING ON/OFF STATE OF ENGINE DURING CRUISE CONTROL IN A HYBRID VEHICLE

TECHNICAL FIELD

The present disclosure generally relates to a control system in a hybrid vehicle that delays engine stop/start activity during cruise control.

BACKGROUND

Hybrid electric vehicles (HEVs) include both an engine and at least one electric motor to provide drive torque to the wheels. There are various types of HEVs. For example, "parallel" hybrid vehicles typically include clutches that selectively enable either or both the engine and the motor to provide drive torque. A "series" hybrid vehicle typically includes an electric motor that is always driveably connected to the road wheels, and an engine that is not mechanically connected to the wheels. In other words, the engine does not provide any of the torque required to propel the vehicle. Rather, in a "series" hybrid vehicle, the engine powers a generator to produce electrical energy that is stored in the battery and/or used by the motor.

Any type of HEV can be equipped with a cruise control system in which an operator can define a set speed for the vehicle to travel. When cruise control is activated by an operator, the HEV's control system maintains the vehicle speed at the set speed by controlling the engine and the electric motor to provide an adequate amount of combined torque to the wheels. If the motor alone can provide adequate torque to maintain the speed of the HEV, the engine can be turned off to conserve fuel. The engine may later have to be started if, for example, additional torque is necessary that cannot be fulfilled by the electric motor alone. Excessive engine stopping and starting during cruise control can impact drivability and NVH of the vehicle.

SUMMARY

According to one embodiment, a vehicle comprises an engine, an electric machine, and at least one controller. The electric machine is selectively coupled to the engine via a clutch and configured to selectively provide drive torque. The at least one controller programmed to, in response to detecting a frequency associated with changes in vehicle speed during cruise control, delay changing an on/off state of the engine for an amount of time that is based on the frequency.

The frequency can be based on changes in a difference between an actual vehicle speed and a cruise control set speed. The frequency associated with changes in vehicle speed can be a frequency of road load, including the road grade, wind resistance, and mass of the vehicle that all affect the instantaneous speed of the vehicle. The controller can then change the on/off state of the engine upon expiration of the amount of time.

According to another embodiment, a vehicle comprises a powertrain, a cruise control system, and at least one controller. The powertrain includes an engine and an electric machine selectively coupled to the engine via a clutch. The at least one controller programmed to, when the cruise control system is active, inhibit changing an on/off state of the engine for an amount of time that is based on a period of oscillation associated with the road load.

According to yet another embodiment, a method of controlling a hybrid vehicle is provided, wherein the hybrid vehicle has an engine selectively coupled to an electric machine. The method includes activating a cruise control mode of operation in response to operator input. Thereafter, during cruise control, the method includes inhibiting changing an on/off state of the engine based on a frequency associated with changes in vehicle speed.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
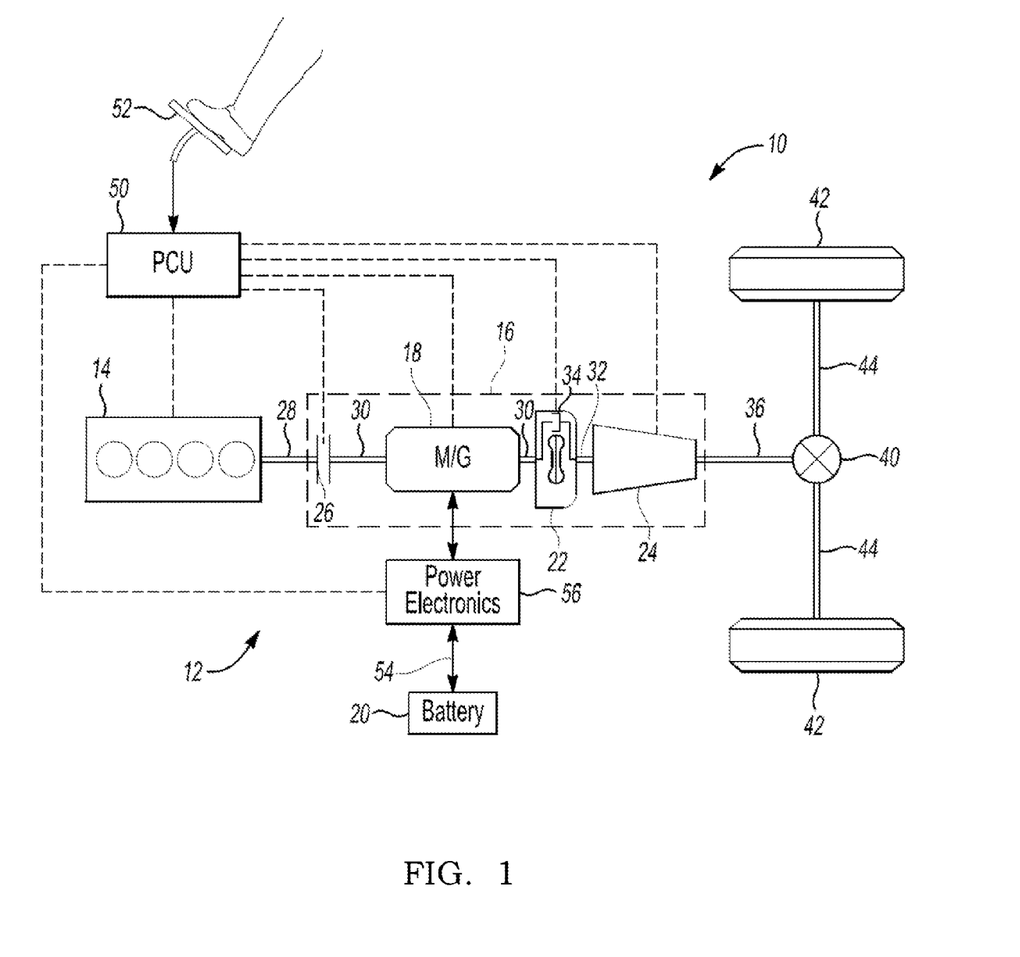
FIG. 1 is a schematic of a hybrid electric vehicle according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). The gearbox 24 then provides powertrain output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch or hydraulic pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. In either of these situations, it can be said that the M/G 18 is providing negative torque such that it is reducing (or not increasing) the overall torque transferred to the wheels. When the M/G 18 is operating as a motor and providing torque to the wheels, it can be said that the M/G 18 is providing positive torque.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

In any hybrid vehicle configuration, a cruise control system may be provided by various components, such as the engine and the M/G, and controlled by a controller. In the embodiment of the hybrid vehicle of FIG. 1, a cruise control system can be defined at least in part by the controller 50, the engine 14, the M/G 18, and the disconnect clutch 26. When a "cruise control" option is selected by the operator of the vehicle, the operator intends for the vehicle to maintain a specific speed without further input by the accelerator pedal. During cruise control, the controller 50 communicates with and controls the engine 14 and M/G 18 to fulfill the necessary torque requirements to maintain the vehicle at the commanded speed.

Figure 2:
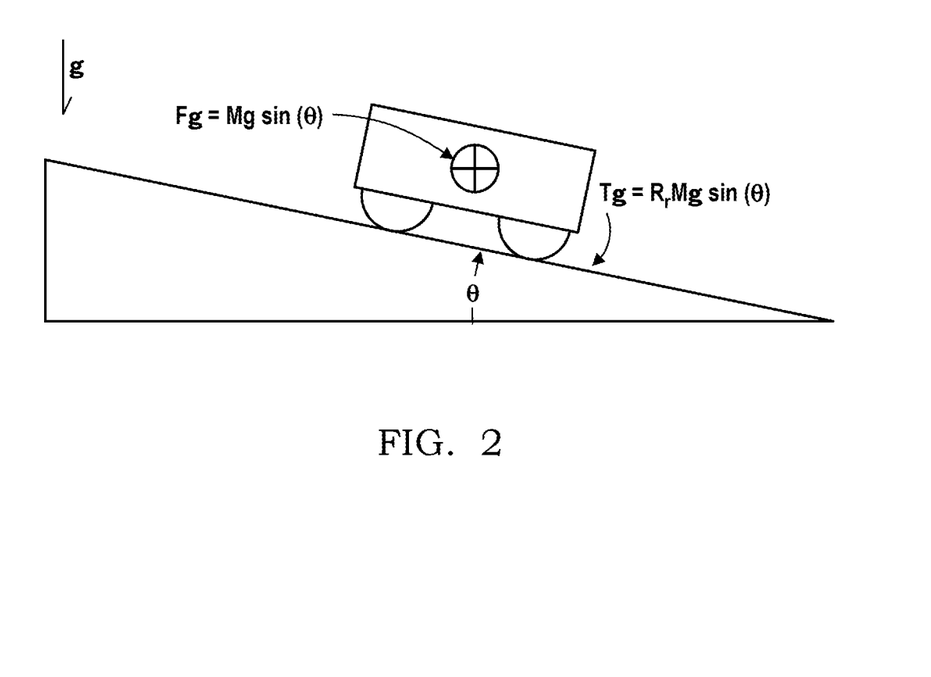
FIG. 2 is schematic representation of the impacts of road grade on wheel torque of a vehicle.

When in cruise control, the torque required to be output by the engine 14 and/or the M/G 18 to maintain the vehicle's speed is a function of "road load," that is, the vehicle's instantaneous torque demands, i.e., the amount of torque required to propel the vehicle at a desired speed. Road load varies as a function of all forces that act against the vehicle during movement, such as the grade (slope) of the road, the nature of the terrain (rocks, dirt, pavement, ice, etc.), the weight of the vehicle, the speed of the vehicle, and the wind resistance. FIG. 2 illustrates the impact of the road grade on the wheel torque and road load. Due to these defining factors of road load, the road load typically remains positive even during cruise control on a flat road surface. Additional torque can be provided by the engine or M/G if additional torque is required to maintain the vehicle's speed (i.e., a positive road load). The road load can also be negative. For example, when descending a hill, the negative road load (i.e., torque available at the wheels in excess of that required to propel the vehicle) can be employed via regenerative braking to charge the battery. This converts the excess torque into power stored in the battery while maintaining the desired vehicle speed.

The cruise control system in a hybrid vehicle, such as that illustrated in FIG. 1, responds to changes in the desired vehicle speed set point to increase or decrease the vehicle speed. The cruise control system also controls the vehicle speed to the set point speed in the presence of disturbances such as changes in the road load. The control system controls the engine mode selection (on/off) and the torque output of the M/G to minimize fuel consumption while maintaining the desired speed.

Many road load factors may generate a disturbance in the feel of the vehicle during cruise control. For example, a sharp incline can cause the actual velocity of the vehicle to decrease even while the commanded velocity remains constant. The existing control strategy in the vehicle must account for the increase in road load, and increase the torque output of the engine and/or M/G accordingly. If the engine is off during these increases in road load, the controller may be forced to start the engine to produce the necessary torque to fulfill the vehicle's demands and maintain the vehicle speed. Inclines in the road load followed immediately by declines in the road load (or vice versa), if unaccounted for, might cause undesirable and numerous engine starts and stops. In an even less desirable scenario, the road load can oscillate dramatically and quickly over time. One strong candidate for causing such oscillations is a variation in the road grade as the vehicle travels over the road. If these oscillations in road load (e.g., road grade) are unaccounted for, the controller may command a high number of unwanted and unnecessary number of engine starts/stops, which can degrade the NVH and drivability of the vehicle.

According to various embodiments of the present disclosure, a control strategy is provided that controls the engine and M/G during cruise control to improve the NVH and drivability of the vehicle in light of the detected exemplary scenarios above. The control strategy can cause a delay or otherwise inhibit the engine from stopping or starting during cruise control, even when such activity might otherwise be necessary to meet the road load requirements, based on the oscillation of the road load causing an oscillation of actual vehicle speed.

Figure 3:
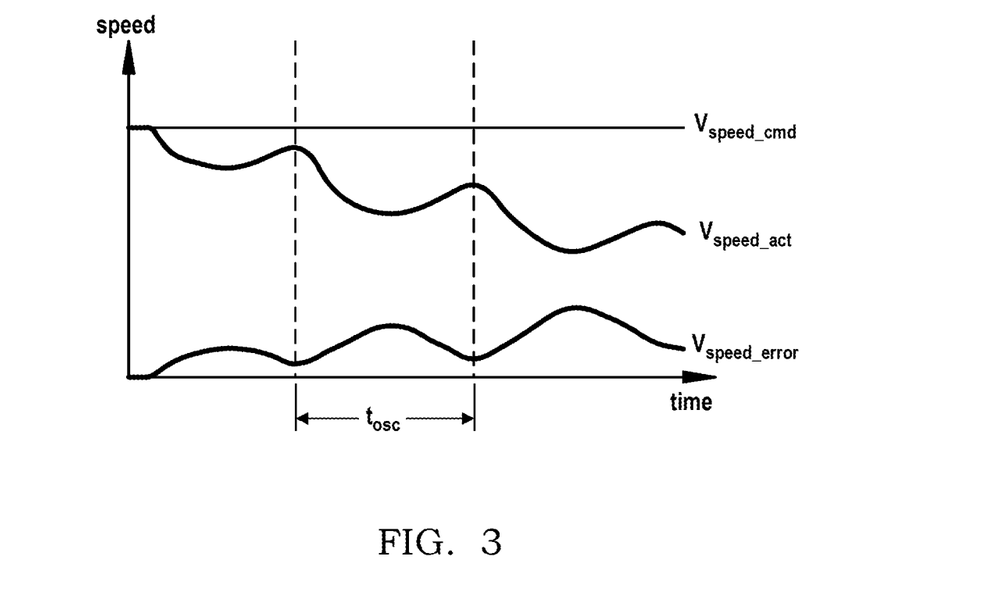
FIG. 3 is an exemplary graphical illustration of oscillations of the vehicle speed during cruise control and the time period of the oscillation'

FIG. 3 illustrates one possible cruise control disturbance, namely, an oscillation in the road load causing an oscillation in the speed of the vehicle. The actual vehicle speed ($V_{speed\_act}$) is compared to the commanded vehicle speed ($V_{speed\_cmd}$) that remains constant during cruise control, provided no commanded change in the set speed is provided by the operator. Changes in the road grade, such as bumps, potholes, and the like, can cause an oscillating nature in the actual vehicle speed. The period of oscillation ($t_{osc}$) can be determined by the controller, illustrated in FIG. 3 as the peak-to-peak time, or the time of one cycle of oscillation. Depending on the nature of the oscillation in road load, the period of oscillation range from fractions of a second (e.g., small bumps in the road) to several seconds (e.g., a series of hills in the road). The oscillation in road load and velocity can also be caused as a reactionary force in the suspension of the vehicle after the vehicle travels over rugged terrain.

An error ($V_{speed\_error}$) can also be determined by the controller as the difference between the commanded vehicle speed and the actual vehicle speed. The controller can minimize engine shutdown/restart busyness by introducing a control strategy that delays engine shutdown/restart by an amount of time (delay) that is a function of the oscillation period of this cruise control speed error. This delay is intended to minimize the likelihood of unnecessarily stopping or starting the engine in response to rapid increases or decreases in the necessary torque required to maintain the cruise control set speed, when doing so may be unnecessary due to the oscillating nature of the load. In other words, an abrupt increase in load followed by an abrupt decrease in load, especially when both oscillating over time, may not require an immediate engine start/stop to fulfill the necessary torque to maintain cruise control speed. A delay in engine starting/stopping can reduce the busyness that might otherwise occur with each increase and decrease in load.

Particularities of the control strategy are defined below to determine when and how long to delay engine starting/stopping during cruise control. As is the case with all portions of this disclosure, these particularities are not intended to be limiting and are merely exemplary control methods within the scope of the invention.

Using a hybrid vehicle such as that illustrated in FIG. 1, vehicle acceleration can be described as:

$$R_r M_{veh} A_{veh} = M_{veh} R_r^2 \dot{\omega}_{wh} = I_{veh} \dot{\omega}_{wh} = (T_{eng} + T_{MG}) - (T_{RL} + R_r M_{veh} g \sin(\theta_{ave})) \quad (1)$$

where $R_r$ is the wheel rolling radius, $M_{veh}$ is the mass of the vehicle, $A_{veh}$ is the vehicle acceleration, $\omega_{wh}$ is the wheel speed, $I_{veh}$ is the inertia of the vehicle, $T_{eng}$ is the engine torque, $T_{MG}$ is the M/G torque, $T_{RL}$ is the vehicle road load which is a function of vehicle speed and gear, among other variables described above, g is gravity, and θ is angle of inclination, or grade, as shown in FIG. 2.

With a constant road load, grade, and cruise control set speed, the wheel and vehicle speeds are constant. Therefore, the following relationships exist:

$$I_{veh} \dot{\omega}_{wh} = 0 = (T_{Eng} + T_{MG}) - (T_{RL} + R_r M_{veh} g \sin(\theta)) \quad (2)$$

$$(T_{eng} + T_{MG}) T_{cc|ss} = (T_{RL} + R_r M_{veh} g \sin(\theta)) \quad (3)$$

where $T_{cc|ss}$ is the steady state cruise control wheel torque, i.e., the total wheel torque in cruise control when the actual vehicle speed is constant.

Figure 4:
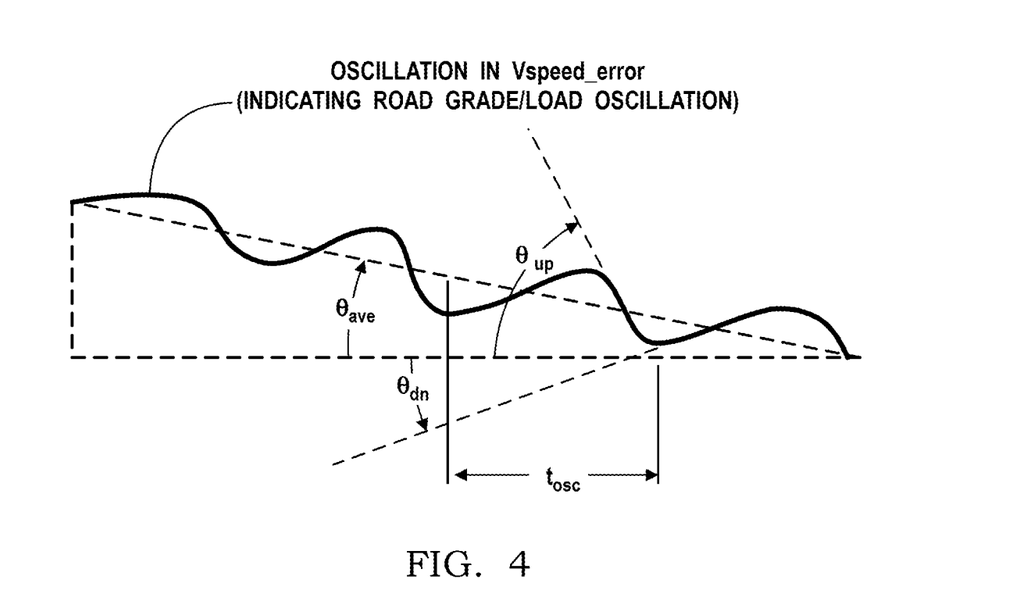
FIG. 4 is an exemplary graphical illustration of variations in local road grade versus average road grade and a period of local road grade oscillation.

During a change in road grade causing a change in road load, the change in the steady state torque can be described as:

$$\Delta(T_{eng} + T_{MG}) = R_r M_{veh} g(\sin(\theta(t)) - \sin(\theta_{ave})) \quad (4)$$

where $\theta_{ave}$ is the average inclination during the change in road grade and θ(t) is the inclination or grade at one particular time. FIG. 4 provides an illustration of the average inclination $\theta_{ave}$ and its comparison to the up-slope and down-slope of the undulations in the road grade (or undulations in the corresponding vehicle speed or speed error).

During an oscillation in the road grade, if the cruise control system does not respond to the oscillation (i.e., if the total wheel torque remains unchanged), the wheel acceleration can be represented by the following, given the relationships described above:

$$\omega_{wh} = \frac{R_r M_{veh} g (\sin(\theta(t)) - \sin(\theta_{ave}))}{I_{veh}} \quad (5)$$

Given Equations 4 and 5 above, the oscillation in θ(t) drives the oscillation in the wheel speed and vehicle speed, as well as the oscillation in the commanded wheel torque and road load. These values are recorded in a storage medium over time, and the cruise control system acts to mitigate the change in actual vehicle speed by increasing torque output by the engine and/or M/G, and stopping/starting the engine if necessary. The period of oscillation in the vehicle speed or cruise control wheel torque, $T_{cc}$, can be determined by measuring the oscillation period in the cruise control speed set point speed error:

$$V_{speed\_err} = V_{speed\_cmd} - V_{speed\_act}(t) \quad (6)$$

where $V_{speed\_err}$ is the vehicle speed error, $V_{speed\_cmd}$ is the commanded vehicle speed, and $V_{speed\_act}$ is the actual vehicle speed. Each of these factors are described above and illustrated in FIG. 3.

The period of the oscillation in the vehicle speed error $V_{speed\_err}$ corresponds to the period in the road grade oscillation $T_{osc}$. The engine shutdown/restart activity that would otherwise be commanded can be delayed by an amount of time that is a function of this cruise control vehicle speed error oscillation period. An initial minimum delay value can be provided to minimize the likelihood of stopping or starting the engine when there is a rapid decrease or increase, respectively, in the road grade, causing a corresponding rapid decrease in the road load and desired wheel torque. The minimum engine shutdown delay time inhibits engine shutdowns/restarts in the presence of a short period of oscillation $T_{osc}$. The control strategy then calculates the oscillation in the cruise control speed error Vspeed_err, or the commanded torque $T_{cc}$, and uses the oscillation period to adjust the length of time of the engine shutdown/restart delay. At the end of the delay, the controller enables the engine to start/stop to fulfill the torque requirements.

Figure 5:
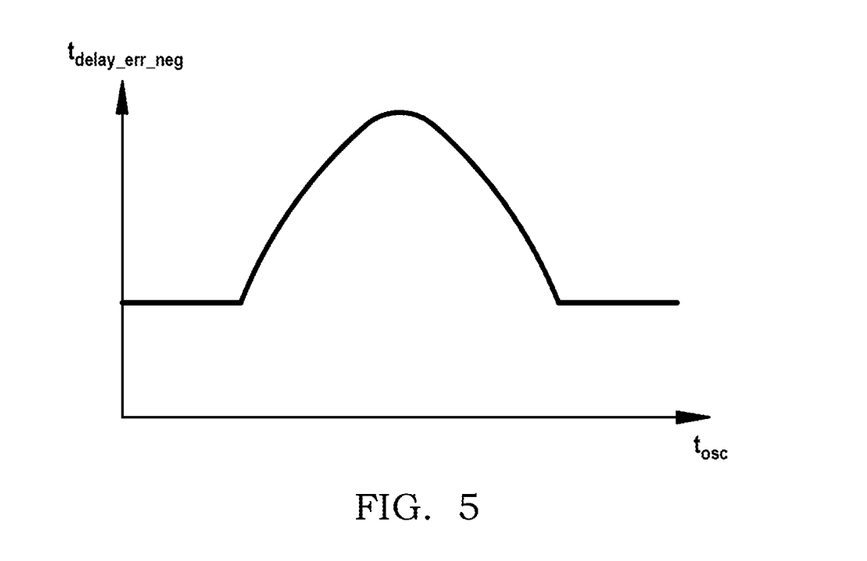
FIG. 5 is an exemplary graphical representation of engine start/stop delay as a function of oscillations in the road load or road grade.

FIG. 5 illustrates an exemplary plot of the amount of time to delay ($t_{delay\_err\_neg}$) commanded engine start/stop event that varies based on the period of oscillation $t_{osc}$. The start/stop delay first increases from a minimum threshold value as the oscillation period increases. Once the oscillation period exceeds a certain value, the delay is reduced back to the minimum value. This approach is used to increase the time delay to avoid engine start/stop as a function of the oscillation period, and as the period exceeds a certain threshold, the oscillation period becomes long enough that the difference between the instantaneous grade θ(t) and the average grade $θ_{ave}$ becomes insignificant.

The engine shutdown delay can also vary as a function of information received from a GPS navigation system that includes a detailed description of the road grade. For example, when the vehicle travels over a certain road segment, the vehicle can store information relating to the road grade. The road grade information can be correlated with the location of the vehicle via its GPS system, and the combined information can be stored either at the vehicle or on an off-board server (e.g., the cloud). When the vehicle drives over this road segment again in the future, the vehicle can retrieve this information and anticipate the changes in the road grade. The start/stop delay can then be programmed to vary as a function of the upcoming (or current) road segment information retrieved.

Figure 6:
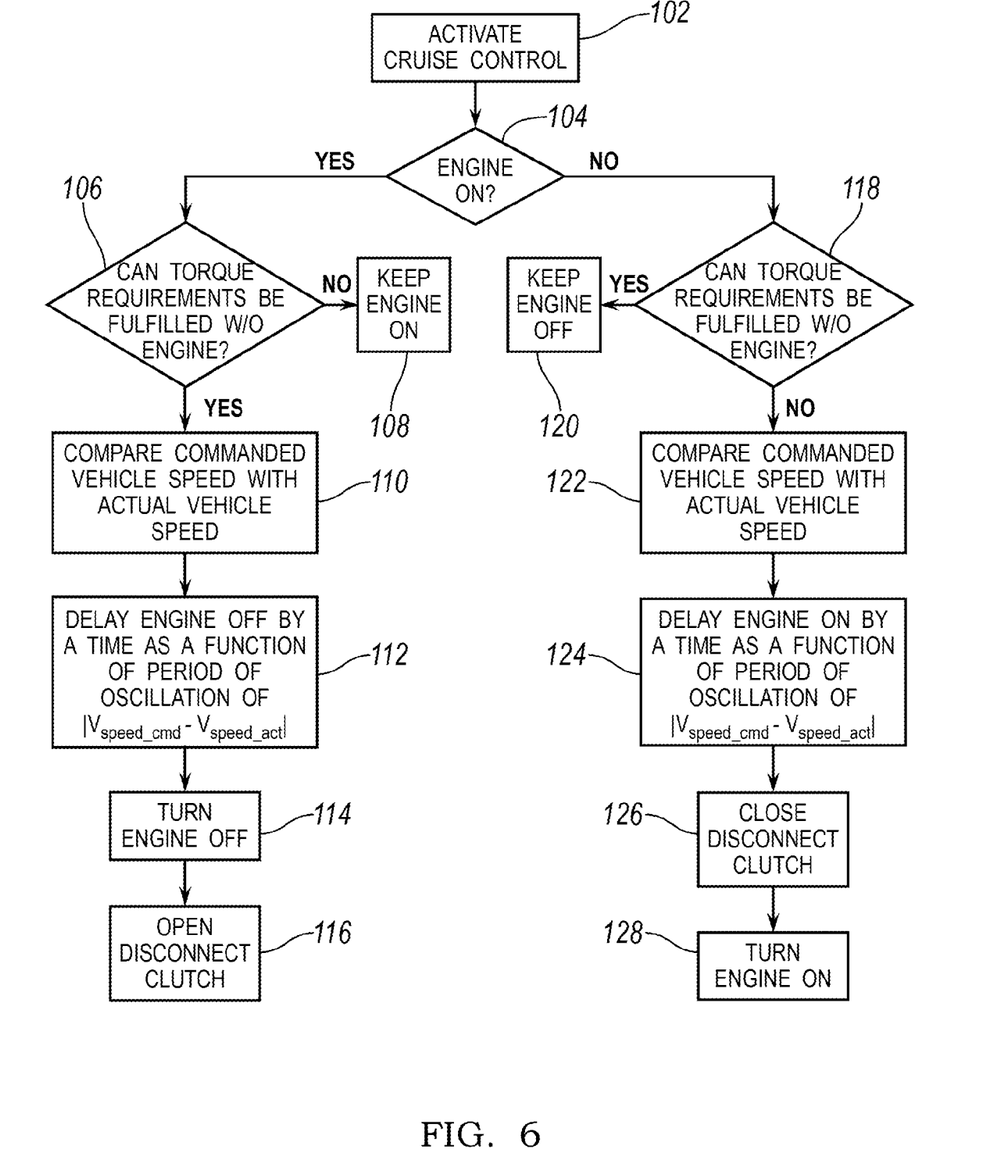
FIG. 6 is a flow chart illustrating a control strategy for delaying engine start/stop according to one embodiment of the present disclosure.

FIG. 6 is a flowchart illustrating one embodiment of a control strategy implemented by the controller. At 102, cruise control is activated based on a selection of such a mode by the operator of the vehicle. This acts to set a desired vehicle speed, and the controller will attempt to maintain the actual vehicle speed at the desired vehicle speed by using the engine and/or M/G.

At 104, the controller checks whether the engine is on or off. The answer to whether or not the engine needs be started or stopped during cruise control is initially based on whether or not the engine is on or off in the first place.

If the engine is on, then at 106 the controller determines whether the current torque requirements during cruise control can be fulfilled without the engine being on. Also included in this step, the controller can determine whether the state of charge of the battery dictates that the engine remain on to charge the battery regardless of whether the torque at the wheels requires the engine to be on.

If the torque requirements cannot be fulfilled without the engine at 106, then the engine is kept on at 108 and the process ends. If, however, the torque requirements (and/or battery SOC) dictate that the engine can be disabled or stopped at 106, then at 110 the controller first compares the commanded vehicle speed with the actual vehicle speed. At 112, the controller determines an amount of time delay to keep the engine on before stopping the engine. The time delay is determined as a function of the period of oscillation of the difference between the commanded vehicle speed and the actual vehicle speed, as discussed above. The time delay can also be determined based on the oscillation of the road load or road grade, as also discussed above. At 114, the engine is then stopped after the time delay. At 116, the disconnect clutch is opened. This decouples the engine from the M/G so that engine drag is not realized in the transmission. The clutch can also be at least partially closed later when the engine is required to be restarted.

If the engine is off at 104, then the controller determines whether the torque requirements can be fulfilled without the engine, similar to 106. If so, the engine is kept off at 120 and the M/G fulfills the necessary propulsion torque. If, however, it is determined that the engine is required to be started to fulfill the torque (and/or battery SOC) requirements, the controller first compares the difference between the commanded vehicle speed and the actual vehicle speed 122 and determines the period of oscillation in the difference at 124. Once the time delay has expired, the disconnect clutch can close at 126 and the engine can be started at 128. When closing the disconnect clutch and starting the engine, additional torque may be required from the M/G to both temporarily fulfill the torque requirements as much as possible while also accounting for the torque loss when turning the engine. Then, once the engine starts, the disconnect clutch can slip (if necessary to reduce engine torque realized at the wheels) and/or the M/G torque can reduce accordingly.

While references are made above to a "period," such as a period of oscillation in the speed or load, it should be understood that "frequency" can be utilized in the control strategy. In other words, rather than specifically determining the time between one period of oscillation, the control strategy can be implemented with determining the number of oscillations in a given time.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    an engine;
    an electric machine selectively coupled to the engine via a clutch and configured to selectively provide drive torque; and
    at least one controller programmed to, in response to detecting a frequency associated with changes in vehicle speed during cruise control, delay changing an on/off state of the engine for an amount of time that is based on the frequency.

2. The vehicle of claim 1, wherein the frequency is based on changes in a difference between an actual vehicle speed and a cruise control set speed.

3. The vehicle of claim 1, further comprising changing the on/off state of the engine upon expiration of the amount of time.

4. The vehicle of claim 1, wherein the detecting is based on at least two changes in sign of slope of the vehicle speed over time.

5. The vehicle of claim 1, wherein the amount of time increases as the frequency decreases.

6. The vehicle of claim 5, wherein the amount of time increases as the frequency decreases toward a threshold and decreases as the frequency increases past the threshold.

7. A vehicle comprising:
    a powertrain including an engine and a motor/generator selectively coupled to the engine via a clutch;
    a cruise control system; and
    at least one controller programmed to, when the cruise control system is active, inhibit changing an on/off state of the engine for an amount of time that is based on a period of oscillation associated with the road load.

8. The vehicle of claim 7, wherein the road load corresponds to a wheel torque necessary to maintain vehicle speed.

9. The vehicle of claim 7, wherein the road load is defined by vehicle load, road grade, or vehicle speed.

10. The vehicle of claim 7, wherein changes in a difference of an actual vehicle speed and a cruise control set speed is indicative of the oscillation.

11. The vehicle of claim 7, wherein the at least one controller is further programmed to, during activation of the cruise control system, delay the stopping/starting of the engine based at least upon a difference between a commanded vehicle speed and an actual vehicle speed over time.

12. The vehicle of claim 7, wherein the at least one controller is further programmed to enable changing an on/off state of the engine in response to an absence of the oscillation.

13. The vehicle of claim 7, wherein the amount of time increases as the period of oscillation increases toward a threshold, and decreases as the period of oscillation increases past the threshold.

14. A method of controlling a hybrid vehicle having an engine selectively coupled to a motor/generator, the method comprising:
    activating a cruise control mode of operation in response to operator input; and
    during cruise control, inhibiting changing an on/off state of the engine based on a frequency associated with changes in vehicle speed.

15. The method of claim 14, wherein the inhibiting includes delaying stopping/starting of the engine for an amount of time that is based on the frequency.

16. The method of claim 15, further comprising stopping/starting the engine in response to an expiration of the amount of time.

17. The method of claim 15, wherein the amount of time increases as the frequency decreases.

18. The method of claim 17, wherein the amount of time increases as the frequency decreases toward a threshold, and decreases as the frequency increases past the threshold.

* * * * *